United States Patent [19]
Ottensooser

[11] Patent Number: 5,905,856
[45] Date of Patent: May 18, 1999

[54] DETERMINATION OF SOFTWARE FUNCTIONALITY

[75] Inventor: Avner Benjamin Ottensooser, Randwick, Australia

[73] Assignee: Bankers Trust Australia Limited, Syndey, Australia

[21] Appl. No.: 08/733,441

[22] Filed: Oct. 18, 1996

[30] Foreign Application Priority Data

Feb. 29, 1996 [AU] Australia ............................... 45837/96

[51] Int. Cl.⁶ .................................................. G06F 11/00
[52] U.S. Cl. ............................... 395/183.14; 395/183.21; 395/183.22
[58] Field of Search ......................... 395/183.14, 183.21, 395/183.22, 185.1, 183.13, 704, 183.08, 183.09, 185.02

[56] References Cited

U.S. PATENT DOCUMENTS

| | | | |
|---|---|---|---|
| 5,335,342 | 8/1994 | Pope et al. ........................ | 395/183.14 |
| 5,357,452 | 10/1994 | Pio-di-Savoia et al. ........... | 395/183.14 |
| 5,495,571 | 2/1996 | Corrie, Jr. et al. ................. | 395/183.14 |
| 5,500,941 | 3/1996 | Gil ..................................... | 395/183.14 |
| 5,557,740 | 9/1996 | Johnson et al. .................... | 395/183.14 |
| 5,596,714 | 1/1997 | Connell .............................. | 395/183.14 |
| 5,600,789 | 2/1997 | Parker et al. ...................... | 395/183.14 |
| 5,629,878 | 5/1997 | Kobrosly ........................... | 395/185.01 |
| 5,634,098 | 5/1997 | Janniro et al. .................... | 395/183.14 |
| 5,652,835 | 7/1997 | Miller ................................ | 395/183.14 |
| 5,657,438 | 8/1997 | Wydogny et al. ................. | 395/183.14 |

OTHER PUBLICATIONS

Mayrhauser et al., "Domain Based Testing: Increasing Test Case Reuse", Computer Design, Int'l Conf., IEEE, pp. 484–491, 1994.

*Primary Examiner*—Joseph E. Palys
*Attorney, Agent, or Firm*—Reed Smith Shaw & McClay LLP

[57] ABSTRACT

A method of determining the functionality of a software system includes inputting a test plan to the software system via a software testing interface program, and logging an indication of one or more resulting outputs of the software system compared to expected output(s). The test plan invokes a sequence of test scripts and includes associated parameter inputs for the test scripts, and an expected output of the function or transaction of each test script. The test scripts are selected from a set of test scripts each able, when input to the software system via a software testing interface program, to prompt performance of a transaction or function for which the software system is designed.

58 Claims, 8 Drawing Sheets

State Transition Diagram for SDL Parser

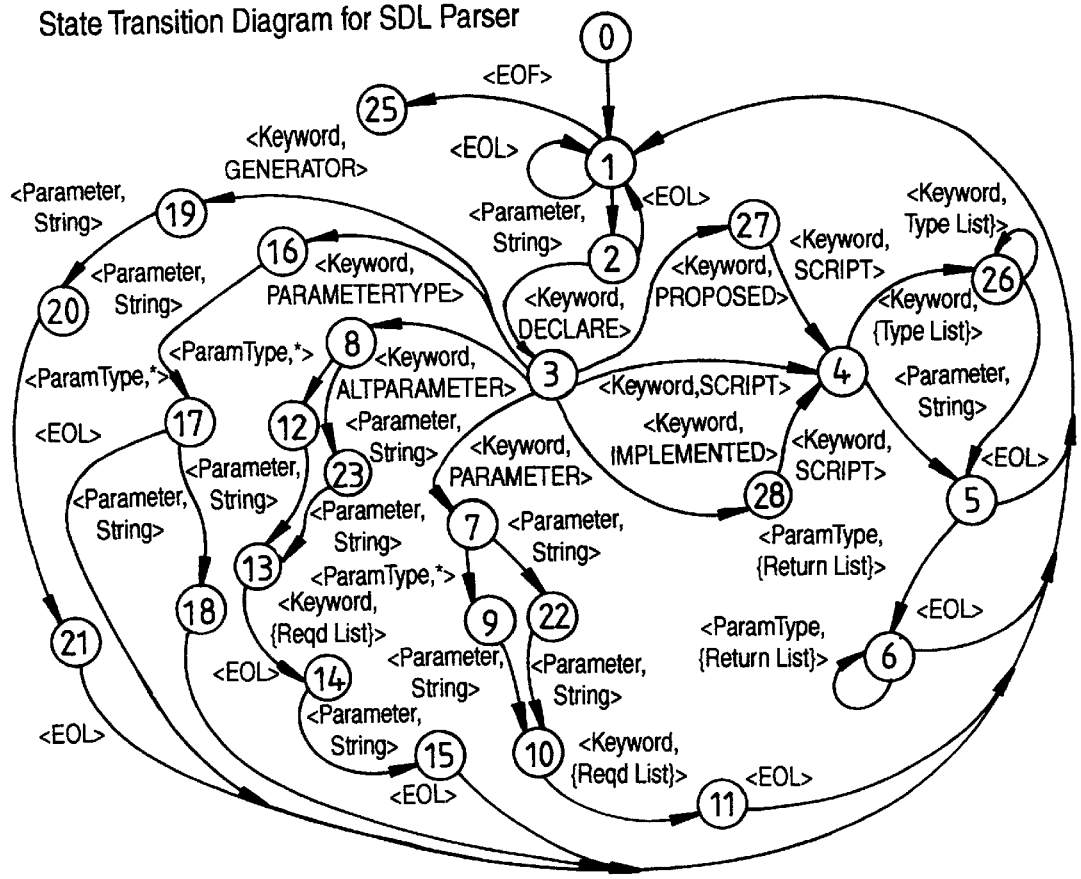

'Script Definition Language states
Const BTA_SDL_BEGINSTATE = 0
Const BTA_SDL_DECLARELINE = 1
Const BTA_SDL_DECLARELINEID = 2
Const BTA_SDL_DECLARE = 3
Const BTA_SDL_DECLARESCRIPT = 4
Const BTA_SDL_SCRIPTNAME = 5
Const BTA_SDL_SCRIPTRETPARAM = 6
Const BTA_SDL_DECLAREPARAM = 7
Const BTA_SDL_DECLAREALTPARAM = 8
Const BTA_SDL_PARAMTYPE = 9
Const BTA_SDL_PARAMDESC = 10
Const BTA_SDL_PARAMREQD = 11
Const BTA_SDL_ALTPARAMTYPE = 12
Const BTA_SDL_ALTPARAMDESC = 13
Const BTA_SDL_ALTPARAMREQD = 14
Const BTA_SDL_ALTPARAMREFLINE = 15
Const BTA_SDL_DECLAREPARAMTYPE = 16
Const BTA_SDL_PARAMTYPENAME = 17
Const BTA_SDL_PARAMTYPEDLIM = 18
Const BTA_SDL_DECLAREGENERATOR = 19
Const BTA_SDL_GENERATORDESC = 20

Const BTA_SDL_GENERATORPARAMTYPE = 21
Const BTA_SDL_PARAMLITERAL = 22
Const BTA_SDL_ALTPARAMLITERAL = 23
Const BTA_SDL_ERRORSTATE = 24
Const BTA_SDL_FINISHSTATE = 25
Const BTA_SDL_SCRIPTTYPE = 26
Const BTA_SDL_SCRIPTPROPOSED = 27
Const BTA_SDL_SCRIPTIMPLEMENTED = 28

<ParamType,*> = {BTA_PRM_SCRIPT,
              BTA_PRM_STRING}
              + User-Defined Types {Return List} = {BTA_PRM_STRING,
              BTA_PRM_SYSTEMDATE}
              +User-Defined Types {Type List} = {SAFE, DANGEROUS,
              USER, DEVELOPER,
              REPEATABLE, NONREPEATABLE}

{Reqd List} = {REQUIRED,OPTIONAL}

FIGURE 5

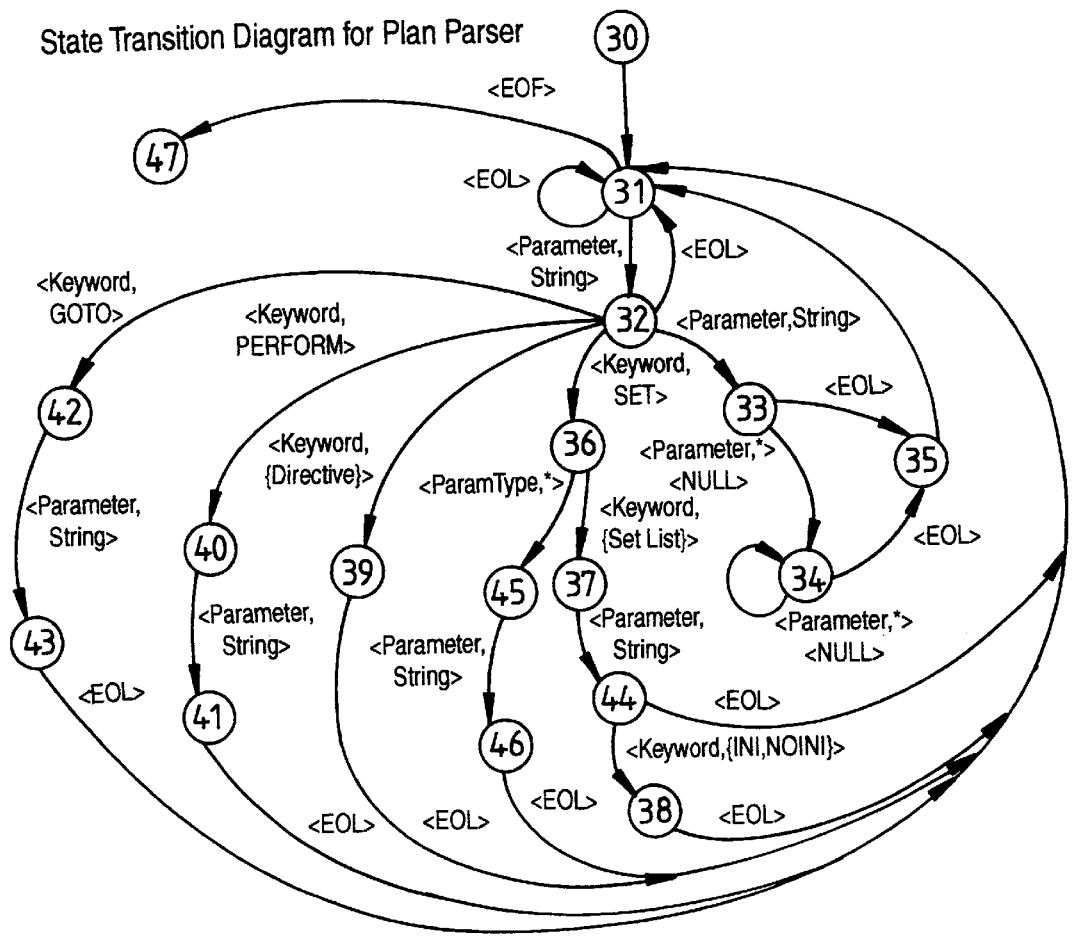

'Parser states
Const BTA_PRSR_BEGINSTATE = 30
Const BTA_PRSR_PLANLINE = 31
Const BTA_PRSR_LINEID = 32
Const BTA_PRSR_SCRIPTNAME = 33
Const BTA_PRSR_PARAMETER = 34
Const BTA_PRSR_NOMOREPARAMS =35
Const BTA_PRSR_SETCOMMAND = 36
Const BTA_PRSR_SETVARIABLE = 37
Const BTA_PRSR_SETINI = 38
Const BTA_PRSR_DIRECTIVE = 39
Const BTA_PRSR_PERFORM = 40
Const BTA_PRSR_PERFORMCOUNT = 41
Const BTA_PRSR_GOTO = 42
Const BTA_PRSR_GOTOLINEID = 43
Const BTA_PRSR_SETVALUE = 44
Const BTA_PRSR_SETPARAMTYPE = 45
Const BTA_PRSR_SETPARAMVALUE = 46
Const BTA_PRSR_FINISHSTATE = 47

{Set List} = {BARCODESEED,
RESPONSETIMEFACTOR,
ANYERRORSTOP,
CONTERRORSTOP,
DEBUGLEVEL}

{Directive} = {ENDPERFORM, EXIT}

<Parameter,*> = Any parameter type

<ParamType,*> = {BTA_PRM_STRING}
   + User-Defined Types

ACTION TABLE

| LineId | ActionCode | CmdPtr | ShortValue | LongValue |
|---|---|---|---|---|
| "THETRUST" | <NOP> | 0 | 0 | 0 |
| "THEFUND" | <NOP> | 0 | 0 | 0 |
| "GETDATE" | <trustcmd> | [BTA_DATE] | 0 | 0 |
| "LOOP" | <beginloop> | 0 | 1 | 0 |
| "CLIENT" | <trustcmd> | [INVADD] | 0 | 0 |
| "AMEND" | <trustcmd> | [AMD001] | 1 | 4 |
| "DEPOSIT" | <trustcmd> | [DEPNBK] | 5 | 9 |
| "TRANID" | <trustcmd> | [IFNHIS] | 10 | 12 |
| "LOOPEND" | <goto> | 3 | 13 | 3 |
| "REVERSE" | <trustcmd> | [REVERSAL] | 13 | 15 |
| "FINISH" | <exit> | 0 | 0 | 0 |

SYMBOL TABLE

| Value | DataType | RefPtr |
|---|---|---|
| "INDV" | <string> | 0 |
| <null> | <clientid> | 3 |
| "?" | <barcodeno> | 0 |
| -45Y-6D | <date> | 0 |
| <null> | <clientid> | 3 |
| "?" | <barcodeno> | 0 |
| <null> | <date> | 1 |
| -10D | <date> | 0 |
| "(100,200,300)" | <moneylist> | 0 |
| <null> | <clientid> | 3 |
| <null> | <string> | 1 |
| "DEP" | <string> | 2 |
| <null> | <string> | 0 |
| <null> | <string> | 4 |
| "Correction" | <string> | 0 |

REFERENCE TABLE

| LineId | DataType | Resolution | ActPtr |
|---|---|---|---|
| "THETRUST" | <string> | "SMT" | 1 |
| "THEFUND" | <string> | "EQU" | 2 |
| "CLIENT" | <clientid> | | 5 |
| "TRANID" | <tranid> | | 8 |

DETERMINATION OF SOFTWARE FUNCTIONALITY

FIELD OF THE INVENTION

This invention relates to the determination of software performance, and generally embraces software testing. In a particular aspect, the invention relates to a method of devising a log of representative outputs indicative of functionality of a software system.

BACKGROUND ART

Software testing is, in many cases of software system development, a major time-consuming part of the process. A recent survey has indicated that 40–70% of the software development effort is devoted to the business of software testing and error recovery. Improvement in this area can therefore contribute significantly to an improvement in time-to-market for new or revised products.

Known automated software testing systems, known as test tools, are essentially interfaces which make recordings of inputs applied and outputs produced for many manually performed combinations of system transactions or functions and data for which the system behaves as expected. As a later time, when a new version of the software system has been developed, these recordings can be used for regression testing. The aim of such testing is to develop confidence that changes incorporated in the new system have not unintentionally altered transactions or functions which were already present in the original version.

In regression testing, the test tool plays back the earlier recordings to simulate a user, automatically applying the same inputs to the system, and automatically comparing the system outputs to those originally obtained.

For each system function, the test tool generates a report showing whether the outputs remain the same. If the outputs do remain the same, the system passes the test. The aim of regression testing is to develop confidence that changes incorporated in the new version have not unintentionally altered functions which were already present in the original version.

Automated test tools of this type remove some of the work associated with manual testing. However the process can still be labour intensive:

The data base must be set up before each test.

To make each recording, the system must be run and system functions must be actually performed. Usually the number of combinations of functions and data is large, so nose-to-screen time is very high. Much of this work is repetitive and therefore error prone.

Reports from the test runs are bulky. Reconciling test results is complex and takes a long time.

Even trivial changes to functionality or screen layout may force complete re-recording. It is to be noted that the test tool records inputs to the system quite blindly. Since the program has no knowledge of the business functions involved, or the structure of the input, it cannot ease the repetitive burden on the QA engineer.

Known software testing tools include Microsoft Visual Test, and SQA Robot (trade marks). These are respectively supplied by Microsoft Corporation, and SQA. Inc. of Woburn, Mass.

It is an object of the invention to provide an improved method of determining the functionality of a software system which at least in part alleviates the aforementioned disadvantages of methods utilising known test tool software.

The invention stems from an appreciation that the repetitive burden with conventional automated tools arises in part because the test tool software records inputs to the system under test quite blindly, and has no knowledge of the functions involved or the structure of the input. The method of the invention, in contrast, entails a practical strategy for building in knowledge of the functions of the software system under test. By applying this knowledge, the method is able to significantly reduce testing effort.

On one view, the invention replaces what were known as "scripts" in prior testing tools with a two-step process utilising test scripts which preferably focus on basic transactions or functions, and test plans that flexibly invoke a sequence of the test scripts. On another view, this approach allows the variable data to be separated from the test scripts, thus avoiding a source of inflexibility in the conventional approach.

In a first aspect, the invention provides a method of determining the functionality of a software system, including:

preparing a set of test scripts, each able, when input to the software system via a software testing interface program, to prompt performance of a transaction or function for which the software system is designed;

preparing a test plan which invokes a sequence of said test scripts, and includes associated parameter inputs for the test scripts and an expected output of the function or transaction of each test script;

inputting the test plan to the software system via said software testing interface program and running the test plan; and logging an indication of one or more resulting outputs of the software system compared to expected output(s).

In this aspect of the invention, there is also provided a method of determining the functionality of a software system, including:

preparing a test plan which invokes a sequence of test scripts selected from a set of test scripts each able, when input to the software system via a software testing interface program, to prompt performance of a transaction or function for which the software system is designed, the test plan further including associated parameter inputs for the test scripts and an expected output of the function or transaction of each test script;

inputting the test plan to the software system via said software testing interface program and running the test plan; and logging an indication of one or more resulting outputs of the software system compared to expected output(s).

The invention still further provides, in its first aspect, a method of determining the functionality of a software system, including:

inputting a test plan to the software system via a software testing interface program and running the test plan; and logging an indication of one or more resulting outputs of the software system compared to expected output(s);

wherein said test plan invokes a sequence of test scripts and includes associated parameter inputs for the test scripts, and an expected output of the function or transaction of each test script, which test scripts are selected from a set of test scripts each able, when input to the software system via a software testing interface program, to prompt performance of a transaction or function for which the software system is designed.

In a second aspect, the method includes the further step of generating a response indicative of functionality of a software system. The response may include generation of a log of representative outputs indicative of the functionality of the software system. The response may further alternatively include a change to the state of a database.

In a third aspect, the invention provides computer apparatus for determining the functionality of a software system, including:

first memory means to store a set of test scripts each able, when input to the software system via a software testing interface program, to prompt performance of a transaction or function for which the software system is designed;

second memory means to store one or more test plans each invoking a sequence of said test scripts and including associated parameter inputs for the test scripts and an expected output of the transaction or function of each test script;

computing means, including installed user interface software and an installed software testing interface program, and operatively connectable to said first and second memory means, for selectively inputting and running the test plan(s) to the software system via the software testing interface program; and logging means for logging an indication of one or more resulting outputs of the software system compared to expected output(s).

Said inputting of the test plan to the software system preferably utilises user interface software which communicates with the software testing interface program as if it were a recording made earlier by the software testing interface program. The user interface software invokes the test script identified in the test plan and advantageously presents each script to the software testing interface program so that the latter also reads the script as a recording made earlier by the software testing interface program.

In a fourth aspect, the invention provides a method of determining the functionality of a software system, and/or of generating a response indicative of functionality, including:

inputting a test plan to the software system via a software testing interface program; and logging an indication of one or more resulting outputs of the software system compared to expected output(s);

wherein said test plan invokes a sequence of test scripts selected from a set of test scripts each able, when input to the software system via a software testing interface program, to prompt performance of a transaction or function for which the software system is designed; and wherein said inputting of the test plan to the software system utilises user interface software which presents each test script to the software testing interface program so that the latter reads the script as a recording made earlier by the software testing interface program.

In a fifth aspect, the invention provides a computer apparatus for determining the functionality of a software system, including:

first memory means to store a set of test scripts each able, when input to the software system via a software testing interface program, to prompt performance of a transaction or function for which the software system is designed;

second memory means to store one or more test plans each invoking a sequence of said test scripts;

computing means, including installed user interface software and an installed software testing interface program, and operatively connectable to said first and second memory means, for selectively inputting the test plan(s) to the software system via the software testing interface program and running the test plan; and logging means for logging an indication of one or more resulting outputs of the software system compared to expected output(s);

wherein the user interface software is arranged for presenting each test script to the software testing interface program so that the latter reads the script as a recording made earlier by the software testing interface program.

Preferably, the parameter inputs for test scripts after the first include parameter inputs derived from recorded outputs of earlier test scripts. Also preferably, generator utility functions are employed in test plans to uniquely generate and/or identify parameter values. These techniques assist in minimising hardcoding of inputs to test scripts, and instead optimise parameter decoupling.

Preferably, the test plan(s) are written in a characteristic language utilising names for the respective test scripts, an established sequence for parameter inputs, identifiers for the respective parameters, parameter generator notation, and parameter broker notation instructing derivation of parameter inputs from recorded outputs of other test scripts.

Advantageously, operation of each of the test plans includes recordal of an inheritance file containing the values returned by test scripts while the test plan was running. An instruction, eg a special test script, may provide for access to the values in inheritance files. Later, inheritance files may include both their own values and the values inherited from an earlier inheritance file.

Test scripts are preferably written in the language of the software system under test, and may include a mix of general routines selected from the language, and routines specific to the system under test and often also to the transaction which the test script is intended to mirror.

The user interface software, in any of the aspects of the invention, preferably includes at least a graphical user interface, a test script definition language parser, a test plan parser which generates a set of action codes for each test plan, and an interpreter which responds to the action codes and interacts with the software system under test.

The software testing interface program is preferably a known program, eg SQA Suite incorporating SQA Robot and SQA Test Log Viewer, supplied by SQA, Inc of Woburn, Mass., or MS Test, supplied by Microsoft Corporation.

Preferably, different personnel effect the steps of preparing the test scripts, preparing the test plan(s), and operating the test plan(s).

It is preferred that the steps of preparing transaction and test plans be effected in parallel with the analysis/design and construction stages of creating the software system whose functionality is being determined.

BRIEF DESCRIPTION OF DRAWINGS

The invention will now be further described, with reference to the accompanying diagrams, in which:

FIG. 5 is a state transition diagram for the SDL parser;

FIG. 6 is a state transition diagram for the script plan parser of TTS Shell;

FIG. 8 is a table set referred to in Example 2.

OVERVIEW OF PREFERRED EMBODIMENTS

Figure 1:
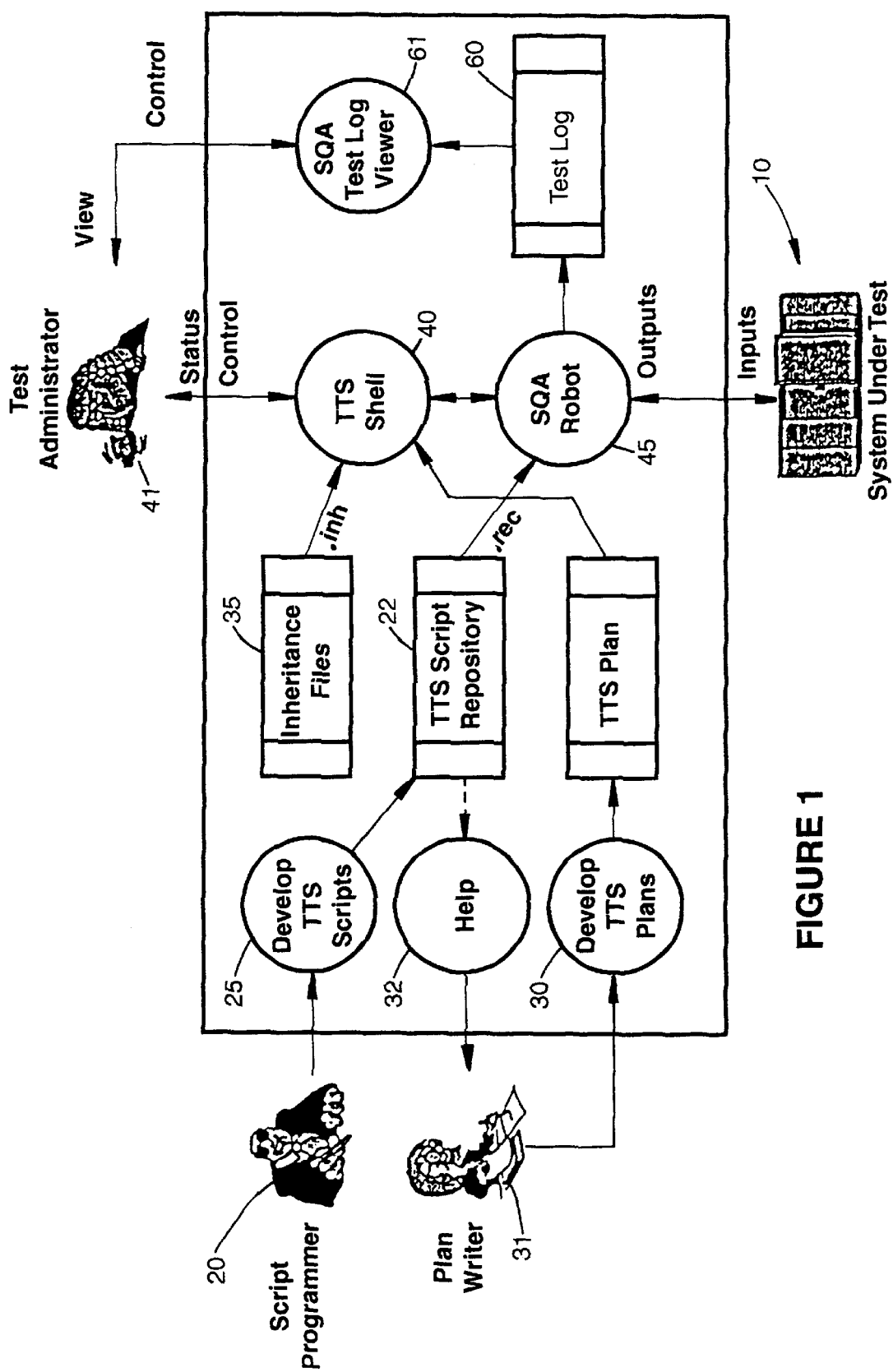
FIG. 1 is a simple block diagram of the architecture of an exemplary embodiment of the method of the invention, intended for testing a trust management software system and identified as Trust Testing System (TTS)

FIG. 1 depicts in block diagrammatic form, the essential elements of an embodiment of the invention, designed to test a trust management software system 10. The embodiment is for convenience hereinafter referred to as TTS, acronym for Trust Testing System. It is of course emphasised that the broad principles of the invention are in no way confined to any particular software system, but may be adapted for application to a wide variety of software applications.

A first step of the method is for a programmer 20, to develop a comprehensive set of test scripts, hereinafter referred to simply as scripts 25, covering the functionality of the system under test 10, and to store them in a storing means or database as a script repository 22. Each script is able, when input to the software system 10 via software testing interface program 45 (in the embodiment chosen to be SQA Robot supplied by SQA, Inc of Woburn, Mass.), to prompt performance of a function or transaction, preferably a single transaction for which software system 10 is designed. Each script can be said to mirror its corresponding transaction in the system under test.

Referring as required to an online Help routine 32, a plan writer 31 utilises a normal text editor to develop and store one or more test plans 30, referred to hereinafter as a TTS Plan, that invokes a selected sequence of scripts 25. For each script invoked, the TTS Plan 30 details the parameter inputs for the corresponding transaction and therefore for the script, and any outputs that the plan writer 31 expects for the transaction. Sometimes, no output is expected, and the effect of the script is simply to update the database.

A Test Administrator 41 utilises a user interface program TTS Shell 40 to input the TTS Plan 30 to the software System 10 via TTS Shell 40 and the SQA Robot testing interface program 45, and runs the Plan. Driven by the Plan, SQA Robot draws the required scripts 25 from repository 22 and activates them to make the system under test 10 perform the corresponding transactions. For each transaction performed, a test log 60 is updated with one or more entries which given an indication of one or more resulting outputs of system 10 compared to the expected input(s). Test log 60 may optionally describe abnormal events. A log entry may simply be either "Success" or "Failure" or "Pass" or "Fail".

At the end of the run, or later, the administrator views test log 60 using SQA Test Log Viewer—another component of the commercial program SQA Suite—to determine if the transaction took place as expected, ie to determine the performance of software system 10.

When a TTS Plan terminates it leaves a legacy, in the form of an "Inheritance File" 35 containing information that Scripts returned to it while it ran. This might include, for example, Client IDs and Transaction ID's. Later, when other TTS Plans run, they may retrieve this information from the Inheritance File and make use of it, for example, to continue processing where the first TTS Plan left off. Inheritance may proceed to any number of levels.

Repository 22 is a segment of a larger centralised database known as SQA Repository, another component of SQA Suite, which also stores test logs.

Usually, a transaction program, eg Script 25, is written in the language of the system under test, and includes a mix of general routines selected from the language, and routines specific to the system under test, and often also to the transaction which the transaction program is intended to mirror. These routines are typically utility routines which perform functions such as obtaining parameters from the TTS Plan, attaching to the system, sending input to the system, checking on-screen fields, and supplying return values to the TTS Plan.

Preferably, test scripts are characterised if their operation affects other users of the system under test, or if they may be invoked only once with the same set of parameter inputs.

In the present embodiment, each Script 25 is a program routine in the language Visual Basic. Each Script is typically stored as a text file. The Script sends a sequence of fields via SQA Robot to the system 10 under test, according to the transaction which the script mirrors, and retrieves on screen fields which the system under test generates.

In the present embodiment of the invention, the test plans—TTS Plans 30—are written in a characteristic language utilising names for the respective test scripts, an established sequence for parameter inputs, identifiers for the respective parameters, parameter generator notation, and parameter broker notation instructing derivation of parameter inputs from recorded outputs of other test scripts.

Inheritances may be passed on. That is, a TTS Plan which inherits values will in turn leave its own legacy consisting of both the values it inherited and its own values.

Preferably, the TTS Shell interface control program 40 checks the TTS plans for syntax errors prior to running.

Preferably, each test log 60 is printed out and stored as a printout for a predetermined period.

The method of the embodiment may conveniently be carried out in a workstation including a personal computer using a 386 or higher microprocessor installed with an appropriate operating system, eg MS-DOS, and with Microsoft Windows, e.g. Windows 3.1 and/or Windows NT and/or Windows 95. The usual ancillary equipment, including a monitor and a mouse or other pointing device, will be required. Visual Basic (eg Version 3.0) and SQA Suite (eg version 3.1) applications must be installed along with the software under test. For TRUST, KEA! must be installed. KEA! is an MS Windows application providing terminal emulation, used to display screens from a VMS or mainframe application in a PC Window. SQA Robot must be configured to accept specific TTS commands.

Generally, it is preferred that the test scripts and test plans are developed by different personnel. Moreover, test plans are best written by people with a detailed knowledge of the business for which a new or updated system is bing written, while the test scripts should be written by a skilled programmer.

USER INTERFACE OF PREFERRED EMBODIMENTS (TTS SHELL)

It is now proposed to outline the nature of the user interface TTS Shell 40, and its interaction with the other components of the system and with SQA Robot, with reference to FIGS. 2 to 5.

Figure 2:
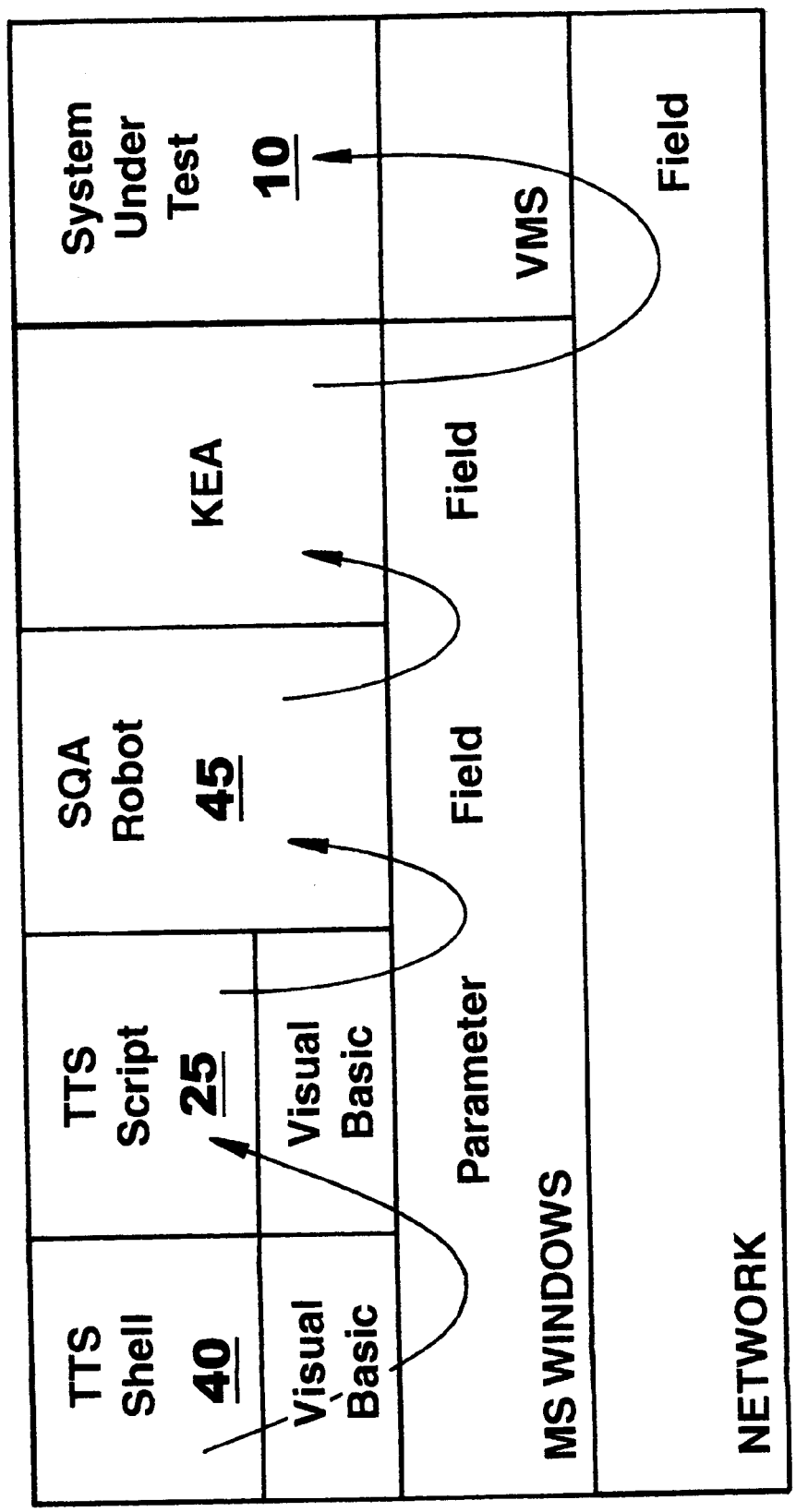
FIG. 2 is a block diagram detailing certain aspects of TTS and illustrating how the components of TTS interact via linking operating systems.

FIG. 2 shows how TTS components typically interact under the management of TTS Shell in the case of a character-cell system like TRUST, utilising SQA Robot as the testing interface.

The Test Administrator starts KEA, the terminal emulator, and SQA Robot and has it "play back" the file tts.rec. SQA Robot thinks this is just a recording that it must have made on some earlier occasion. In fact, however, it is the TTS Shell, a specially-written program that communicates with SQA Robot the same way a recording would.

Once started in this way, the TTS Shell presents a graphical user interface (GUI) to the Test Administrator, who tells the TTS Shell to run a particular TTS Plan (not shown).

As already detailed, lines of the TTS Plan interpreted by the TTS Shell typically contain the name of a TTS Script (eg. INVADD) and some parameters. SQA Robot has a standard facility enabling one. rec file to trigger the execution of another. In dealing with a line in the TTS Plan, the TTS Shell uses this facility to invoke the TTS Script named in the current line of the TTS Plan. SQA Robot thinks the TTS Script is a recording that it made on some earlier occasion. However the TTS Script is in fact synthetic.

At this point the TTS Shell, one TTS Script, SQA Robot and KEA are all in workstation memory under the control of MS Windows. They can communicate with one another using standard MS Windows facilities like DDE.

SQA Robot communicates with the TTS Shell and the TTS Script in the same way it communicates with real recordings, given that these appear as standard .rec files in SQA Robot. SQA Robot is also able to communicate with KEA, which it recognises courtesy of KEA's unique Title Bar tests.

The communication between the TTS Shell and the TTS Script occurs without the knowledge of SQA Robot. DDE is the mechanism for this. The TTS Shell passes to the TTS Script any parameters it finds on the current line in the TTS Plan.

On receiving a parameter, the TTS Script will typically pass it on to SQA Robot as a field, asking SQA Robot to "type" the field at the current cursor position in the KEA window.

Elsewhere on the network, the system under test 10 is running under the control of an operating system such as VMS. KEA communicates with the system under test in the normal way via the network, passing the field to the system under test as shown.

When the TTS Script terminates, the TTS Shell invokes the TTS Script named in the next line of the TTS Plan (if any), and the above process repeats.

Communications between TTS components are many and varied. For example, when the system under test generates screen output, information is passed back in the reverse direction. This, and other modes of communication, are not shown in FIG. 2. SQA Robot is able to ask KEA to return the contents of any rectangle in its 24×80 screen.

The TTS Shell (tts.rec) and TTS Scripts (*.rec) reside in the earlier mentioned SQA Repository under the control of SQA Robot. When one of these programs is to be executed, SQA Robot retrieves it from the SQA Repository using its standard mechanisms. To SQA Robot, these are just normal .rec files. As such, they are layered on Visual Basic.

A TTS Script generates lines to be appended to the test log. It passes these lines to SQA Robot, which adds them in the test log using its standard mechanism. As already noted, the test log is a part of the SQA Repository.

Figure 3:
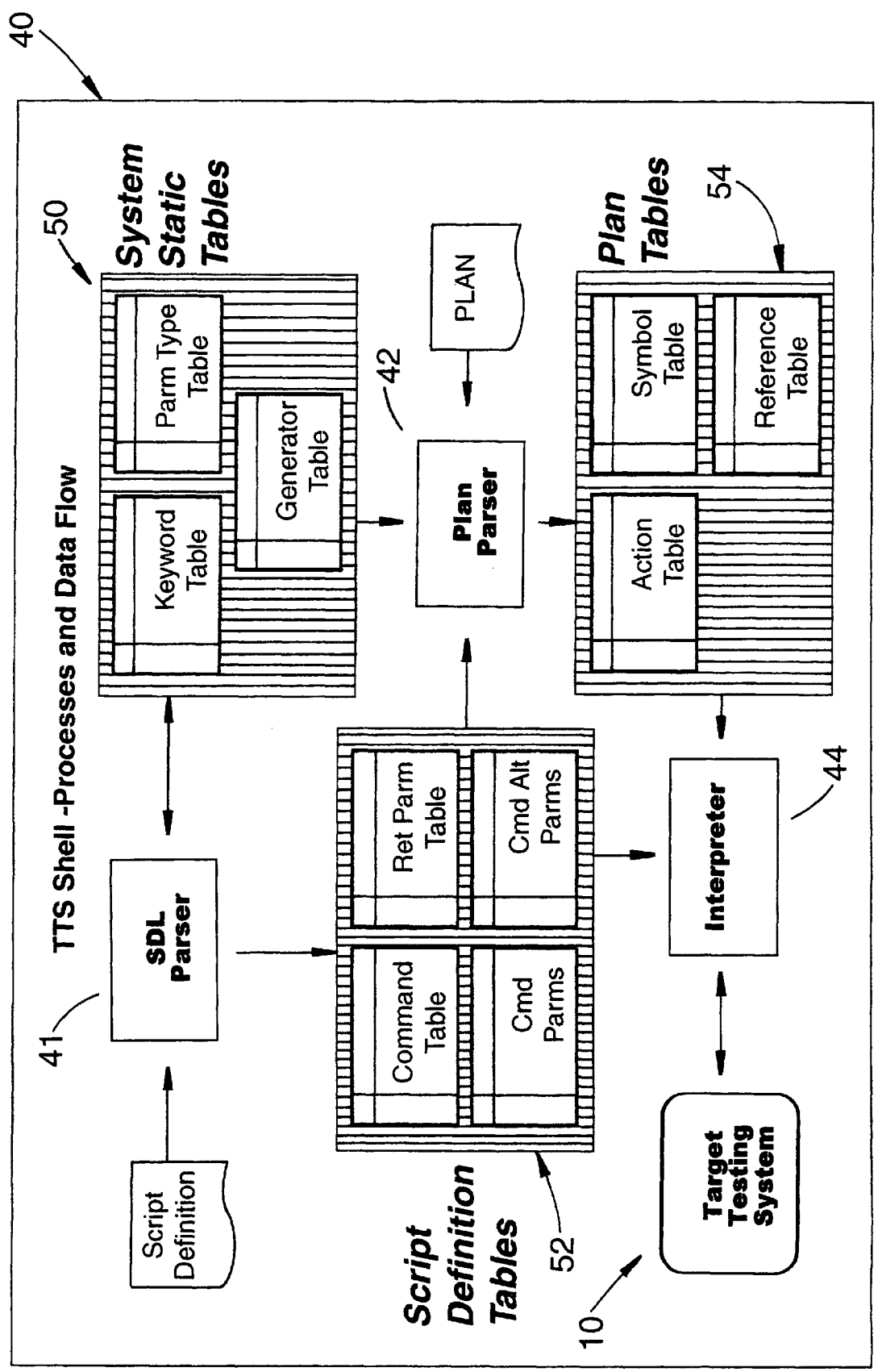
FIG. 3 is a detailed overview of TTS Shell, the user interface of TTS, including the groups of data tables used.

With reference to FIG. 3, the TTS Shell comprises:

Graphical User Interface (GUI) not shown

Script Definition Language (SDL) Parser 41

Plan Parser 42

Interpreter 44

The Form object BTA_frmShell contains all the graphical objects by which the user interacts with TTS. Since all TTS activities are invoked from and monitored by this object, it makes up the GUI component of the TTS Shell. The three remaining components of the TTS Shell are functions defined in BTA_frmShell.

When the user starts TTS, the TTS Shell initialises the System Static Tables 50 which the SDL Parser 41 then loads as it checks the Script Definition file. If the SDL file is syntactically correct, the SDL Parser loads the Script Definition Tables 52 to be used by the Plan Parser 42. The SDL Parser is implemented as the function BTA_bCheckSDL.

Plan Parser 42 uses the Script Definition Tables 52 and the System Static Tables 50 to validate a plan before it can be executed. The Plan Parser converts the syntactically correct plan into a set of action codes (and related parameters) stored in the Plan Tables 54, as input to Interpreter 44. The Plan Parser is implemented as the function BTA_bCheckPlan.

Interpreter 44 performs actions (which may be Shell Commands, eg EXIT, or the execution of Trust Commands) as specified in the Plan Tables 54 and makes reference to the Script Definition Tables 52 to interact with the target system 10. The Interpreter is implemented as the function BTA_bInterpretPlan.

SYSTEM STATIC TABLES

The System Static Tables 50 are loaded by the TTS Shell. These tables contain the definition of System-defined and User-defined Parameter Types, Generators and system Keywords. System-defined parameter types and Keywords are maintained by the Shell programmer while Generators and User-defined Parameter Types are maintained by the Script Definition Language designer.

This group is implemented as three logical tables, within the one physical table 50 [BTA_-xReserved List].

In Tables 50, Keywords are language elements such as EXIT, PERFORM, DECLARE and REQUIRED, which must not be used as Script names or Script parameter values. User-defined Parameter Types must be declared explicitly in the Script Definition Language command file and must not have the same symbolic name as any system-defined parameter types. System-defined Parameter Types (eg BTA_PRM_STRING) are maintained by TTS and must not be declared explicitly. Generators, referred to earlier, are placeholders for data values generated by the Shell, eg. Barcode numbers and Tax File Numbers.

The structure of Table 50 is as follows:

| Attribute | Data Type | Usage |
| --- | --- | --- |
| Id | String | This contains either a keyword, a symbolic parameter type name, or a generator name, as found in the SDL. |
| DelimString | String | Used only by the ParamType table, this contains the special characters delimiting data items of the associated type in the Test Plan. |
| ParamType | Integer | Used only by the Generator table, this contains a pointer to the ParamType table, thus specifying the parameter type generated. |

The Script Definition Tables 52 are loaded by SDL Parser 41 to be used by both Plan Parser 42 and the Interpreter 44, and the data source for these tables is maintained by the script writer. This set of tables consists of Script Command, Return Parameter and Alternate Parameter. The relationships between these four tables is as follows:

The Script Command Table contains the Script Command names and pointers to corresponding parameters, stored in the Script Parameter Table, and the Return Parameter Table. The Script Parameter Table contains pointers to the Alternate Parameter Table.

The structure of each of the four Script Definition Tables is detailed below.

Script Command [BTA_XCommand]

This table contains the Script names and pointers to Script parameters.

| Attribute | Data Type | Usage |
| --- | --- | --- |
| Id | String | Script name |
| ParamStartPtr | Integer | Pointer to first parameter |
| ParamEndPtr | Integer | Pointer to last parameter |
| RetParamPtr | Integer | Pointer to first return parameter |
| Type | Integer | Flag containing bit values that indicate whether or not the script is "dangerous" and/or "non-repeatable" |
| Link | Integer | Pointer to next script in the linked list headed by a Hash table entry. This is used in the loading and searching of script names. |

Return Parameter [BTA_xCmdRetParam]
This table contains the parameters returned by a Script.

| Attribute | Data Type | Usage |
|---|---|---|
| DataType | Integer | The parameter data type. This is a pointer to ParamType Table. |
| Link | Integer | Pointer to the next return parameter in the linked list for a script command. |

Script Parameter [BTA_xCmdParam]
This table contains the parameters required by a Script.

| Attribute | Data Type | Usage |
|---|---|---|
| Data Type | Integer | The parameter data type. This is a pointer to Param Type Table. |
| Literal Value | String | Only applicable where the Plan Parser determines that a parameter is a valid literal for the associated script. This will hold the literal value. |
| Description | String | The parameter description |
| Reqd | Boolean | Indicates if the parameter is required |
| Alt | Boolean | Indicates if the parameter has alternate(s) |

Alternate Parameter [BTA_xCmdAltParam]

| Attribute | Data Type | Usage |
|---|---|---|
| Data Type | Integer | The alternate parameter data type. This is a pointed to Param Type Table. |
| Description | String | The alternate parameter description. |
| Reqd | Boolean | Same as for Script Parameter |
| Alt | Integer | Point to Script Parameter |

PLAN TABLES

The Plan Tables 54 are loaded by the Plan Parser 42 to be used by the Interpreter 44 and the data source for these tables is maintained by the plan writer. This set of tables consists of Action Table, Symbol Table and Reference Table. The relationships between these three tables is as follows:
The Action Table contains pointers to the Symbol Table, while the Symbol Table contains pointers to the Reference Table. The Reference Table, in turn, contains pointers to the Action Table.
The structure of each of the three Plan Tables is detailed below.
Action Table [BTA-xAction]

This table contains the actions and any associated parameters to be performed by the Interpreter. An action may be a Shell Command (eg PERFORM, or EXIT.) or the execution of a Trust Command. Trust Commands usually require parameters and may also return parameters. This table maintains pointers to the Symbol Table where the corresponding parameters are stored.

| Attribute | Data Type | Usage |
|---|---|---|
| Action Code | Integer | The action recognised by the Interpreter |
| LineId | String | The Plan line identifier |
| CmdPtr | Integer | Action BTA_ACT_TRUST CMD: Pointer to the Plan Command. |
| ShortValue | Integer | Action BTA_ACT_TRUST CMD: Pointer to the Symbol Table entry corresponding to the first parameter for this Plan Command. |
| | | Action BTA_ACT-GOTO: Pointer to Line1d reference in Action Table. |
| | | Set environment variable (eg Action BTA_ACT-SETBA RCODE): a flag indicating whether or not the INI file is to be updated. |
| Long Value | Long Integer | Action BTA_ACT-TRUST CMD: Pointer to the Symbol Table entry corresponding to the last parameter for this Plan Command. |
| | | Action BTA_ACT-GOTO: The repeat count (defaults to 1). |
| | | Set environment variable (eg Action BTA_ACT_SETBA RCODE): The value to which the variable is set. |

Symbol Table [BTA_xSymbol]
This table contains the parameters required by a Trust Command. If the parameter is a reference (say to a Client Id returned from a prior Trust Command), this contains a pointer to the Reference Table. If the parameter is generated (eg a Date of Birth), this holds any arguments used by the Generator (eg "-55Y-10D").

| Attribute | Data Type | Usage |
|---|---|---|
| Data Type | Integer | The symbol data type. This is a pointer to Param Type Table. |
| Value | String | The actual parameter value, or, for a generated item, any argument to be used by the Generator |
| RefPtr | Integer | Pointer to Reference Table which will hold the resolution of a reference item |

Reference Table [BTA_xReference]
This table contains the resolution of references. References may be made in Trust Commands to reference entities as defined in the SDL (eg Client Identifiers, Transition Identifiers and Agent Identifiers) returned by a prior Trust Command, and to constant declarations such as:
SET, constant, BTA_PRM_FUND, "SYD"

| Attribute | Data Type | Usage |
|---|---|---|
| LineId | String | The Plan line identifier in which this reference is made |
| ActPtr | Integer | Point to Action Table. This is used by the Plan Parser to determine if a reference item is declared inside the scope of a GOTO command. |
| Data Type | Integer | The reference data type. This is a pointer to Param Type Table. |
| Resolution | String | The string to which the reference resolves |

THE SCRIPT DEFINITION LANGUAGE PARSER
The purpose of the Script Definition Language Parser 41 is to load the Script Definition Tables 52, which are required by the Plan Parser 42 to validate a Test Plan and by the Interpreter 44 when executing the Test Plan.
Before loading the Scrip Definition Tables, SDL Parser 41 validates the data file containing the specification of the Trust Scrip Commands that are available to TTS. The first part of the specification contains a definition of the data types of parameters used by TTS, the second part contains the declaration of any generators of the recognised data types, and the third part contains the declaration of Script commands and their parameters. Scripts in TTS are declared as IMPLEMENTED or PROPOSED. If a Script is implemented, it can be further categorised as:

SAFE or DANGEROUS (its results may affect other users)

REPEATABLE or NONREPEATABLE (it creates data that must be unique)

for USER or DEVELOPER purposes.

Data items in TTS plans may be:

simple parameters of a defined data type reference items pointing to a defined data type these items may be used in the Test Plan in place of simple parameters as placeholders which the Plan Interpreter replaces by values returned from prior Script commands.

generator functions of a defined data type these functions (eg 'GEN_BARCODE', 'GEN_TFN', 'GEN_ILKN') may be used in the Test Plan in place of simple parameters as placeholders which the Plan Interpreter replaces by values returned by the Generator Function.

The specification comprises a record of each parameter the function uses; each record contains the actual Script command, the type of parameter, the description of the parameter and a flag indicating whether or not the parameter is required.

Figure 4:
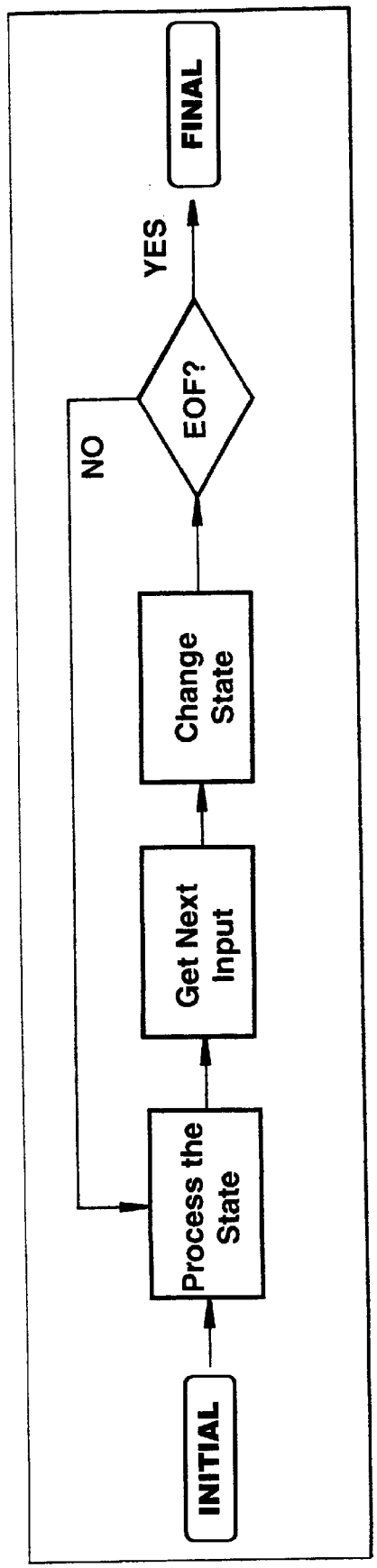
FIG. 4 depicts the processing cycle of the script definition language (SDL) parser and of the plan parser.

SDL Parser 41 is based on the state machine model where, starting from its INITIAL state, it progresses through a set of defined states depending on its input until it reaches its FINAL state. FIG. 4 represents the processing in the parser. The processes Get Next Input and Change State are implemented as the procedure BTA_GetNextToken and the function BTA_iNext State respectively. The output from the machine is the formal definition of the available Trust Script Commands and their corresponding parameters to be used by both the Plan Parser and the Interpreter. FIG. 5 is the State Transition Diagram for the SDL Parser showing both the symbolic name for each state and the input to the state, which is the next token extracted from the SDL file. A token has both a type and a value and is represented in FIG. 5 in the form <token type, token value>, such as <Parameter, String> or <Keyword,DECLARE>. Some token types have only one value and so are represented simply as <token type>, eg <EOL>.

THE PLAN PARSER

The primary purpose of Plan Parser 42 is to check the validity of a Test Plan prior to execution so that Interpreter 44 will pass only valid parameters to the subordinate Scripts. This validation reduces the number of run-time errors and thus saves test elapsed time. A valid plan adheres to the syntax rules defined by the Script Definition Language.

The secondary purpose of Plan Parser 42 is to build the memory tables required by the Interpreter 44 to execute the plan. These tables store action codes and related symbolsthat correspond to the Shell Commands and Trust Command contained in the Plan. Besides obviating the need to re-read the plan file at run time, this method facilitates the implementation of PERFORM loops in a plan.

The Plan Parser also notifies the user if the Plan is attempting to execute PROPOSED, DANGEROUS, NON-REPEATABLE and DEVELOPER Scripts.

The Plan Parser is based on the state machine model where, starting from its INITIAL state, it progresses through a set of defined states depending on its input until it reaches its FINAL state. FIG. 4 also represents the processing in the plan parser. As with parser 41, the processes Get Next Input and Change State are implemented as the procedure BTA_Get NextToken and the function BTA_iNextState respectively. In this case, however the output from the machine is the set of actions and their corresponding parameters to be used by Interpreter 44.

FIG. 6 is the State Transition Diagram for the Plan Parser showing both the symbolic name for each state and the input to the state, which is the next token extracted from the Plan file. A token has both a type and a value and is represented in FIG. 6 in the form <token type, token value>, such as <Parameter,String> or <Keyword, EXIT>. Some token types have only one value and so are represented simply as <token type>, eg <EOL> OR <NULL>.

THE INTERPRETER

The purpose of Interpreter 44 is to execute the Test Plan that has been verified by Plan Parser 42 and converted into a set of actions and associated symbols as specified in plan tables 54.

The principal actions are the running of script procedures that automate the entry of Trust System functions. Other actions allow the Test Plan writer to control the flow of execution of these Trust Commands.

The Interpreter is the table-driven "engine" that traverses the action table translating the action codes specified into:

declaration of constant values used in subsequent Trust commands calls to Trust script procedures changes to environment factors such as the response time factor, maximum allowable errors in script procedures control of flow within the Text Plan.

After each call to a Trust Script procedure, the return status is checked for success/failure. If either the maximum total allowable errors is reached or the maximum allowable consecutive errors is reached, the Interpreter stops execution.

Parameters are passed between the TTS Shell Interpreter 44 and the Trust script procedures using Dynamic Data Exchange (DDE), an element of Visual Basic. In this implementation, the source of the DDE conversation is the TTS Shell and the destination is the Trust script procedure.

The Script Procedure Receives Parameters In the following manner. Prior to calling the Trust script procedure, the Interpreter (function BAT_bInterpretPlan) loads the label control lblScriptLine with a string containing the plan Line Id and script parameters. The Trust script procedure must call the function BTA_sGetScriptLine to retrieve this string from the TTS Shell.

BTA_sGetScriptLine initiates a DDE conversation between the label control lblMailBox (in the form Robot1) and the main form BTA_frmShell. BTA_frmShell has been set at design-time to be the DDE source, with its LinkMode and LinkTopic properties set to 1- Source and "Main" respectively.

The Script Procedure Returns Parameters as follows. Each Trust script procedure must return its process status to the TTS Shell so that the Interpreter (function BTA_bInterpretPlan) can keep its statistics and possibly to abort execution of the plan. The Trust script procedure may also return a parameter string that is used by other Script commands within the Test Plan. The script procedure may return multiple parameters by incorporating the pipe character ("I") separator between each one. The TTS Shell will extract each parameter, validate each according to the script definition in the SDL and store each in Reference Table.

To return its process status, the Trust script procedure must call the VB procedure BTA_-ReturnStatus and to return any parameter string, it must call the procedure BTA_Return Parameters.

BTA_ReturnStatus initiates a DDE conversation between the label control lblMailBox (in the form Robot1) and the main form BTA_frmShell, but here lblMailBox is acting as the source and the label control lblStatus (in for form BTA_frmShell) is acting as the destination using the LinkPoke method.

BTA_ReturnParameters initiates a DDE conversation between the label control lblMailBox in the form Robot1 in the Trust script and lblMailBox in the form Robot1 in BTA_frmShell. So here one instance of lblMailBox is acting as the source and another as the destination using the LinkPoke method.

ADVANTAGES & APPLICATIONS

It will be appreciated that the test plan—the TTS Plan in the embodiment—can be run automatically and unattended, and that the Test Log may be condensed to essential outcomes of each transaction processed by the test plan. By way of summary, the inventive method offers a number of advantages over other automated test tools:

- The most time-consuming aspect of test preparation, namely attended operation of the system during test development, is reduced or eliminated.
- Since the test logs are in a highly condensed format, interpretation of test results is much faster and less prone to error. Moreover, the condensed, controlled format renders the invention especially suited to auditable applications.
- Tests can be free-standing, without dependence on earlier tests or initial database content, because test scripts provide a convenient mechanism for tests to initialise their own test beds.
- Investment in test suites (ie a set of test plans, eg TTS Plans) is preserved over many versions of the system. A change in system functionality is normally handled with relatively minor changes to a few existing test scripts, preserving all other test scripts and all test plans.
- Time to market is improved, because automated testing because automated testing begins much earlier. With conventional test tools, development of test suites cannot begin until the final system is released from development. Automated testing cannot begin until long after development is complete. Test suites of test plans, however, can and preferably should be, prepared from the Functional Specification while development is in progress. This process is depicted in FIG. 3 and discussed further below. Automated testing begins the day system development is complete. Last-minute functionality changes are accommodated with ease.
- The structure permits the use of a simple language which allows the user to write a set of tests that closely match the business activities under scrutiny. The language is sufficiently high level so that the user does not have to be involved in the highly technical "behind the scenes" type work that actually tells the computer application what to do. Other products on the market are not as advanced and rely on the skills of computer programmers to write test plans rather than business users. Thus, there is an ability to convert high level business instructions into low level computer transactions. This allows the customer to focus attention on business issues rather than computer issues.
- Test suites are more maintainable. The number of test scripts is minimised because one test script can handle any combination of data values.
- Developer productivity is improved by simulating complex business transactions during debugging.
- For a given system, the repository test scripts form a common resource which may be shared and re-used by all project teams, leading to productivity improvements.
- Auditability is greatly enhanced. Because test plans such as TTS Plans mirror the business, it is easier to ensure adequacy of coverage. And the highly compact nature of test logs make for quicker and more thorough audit.

Figure 7:
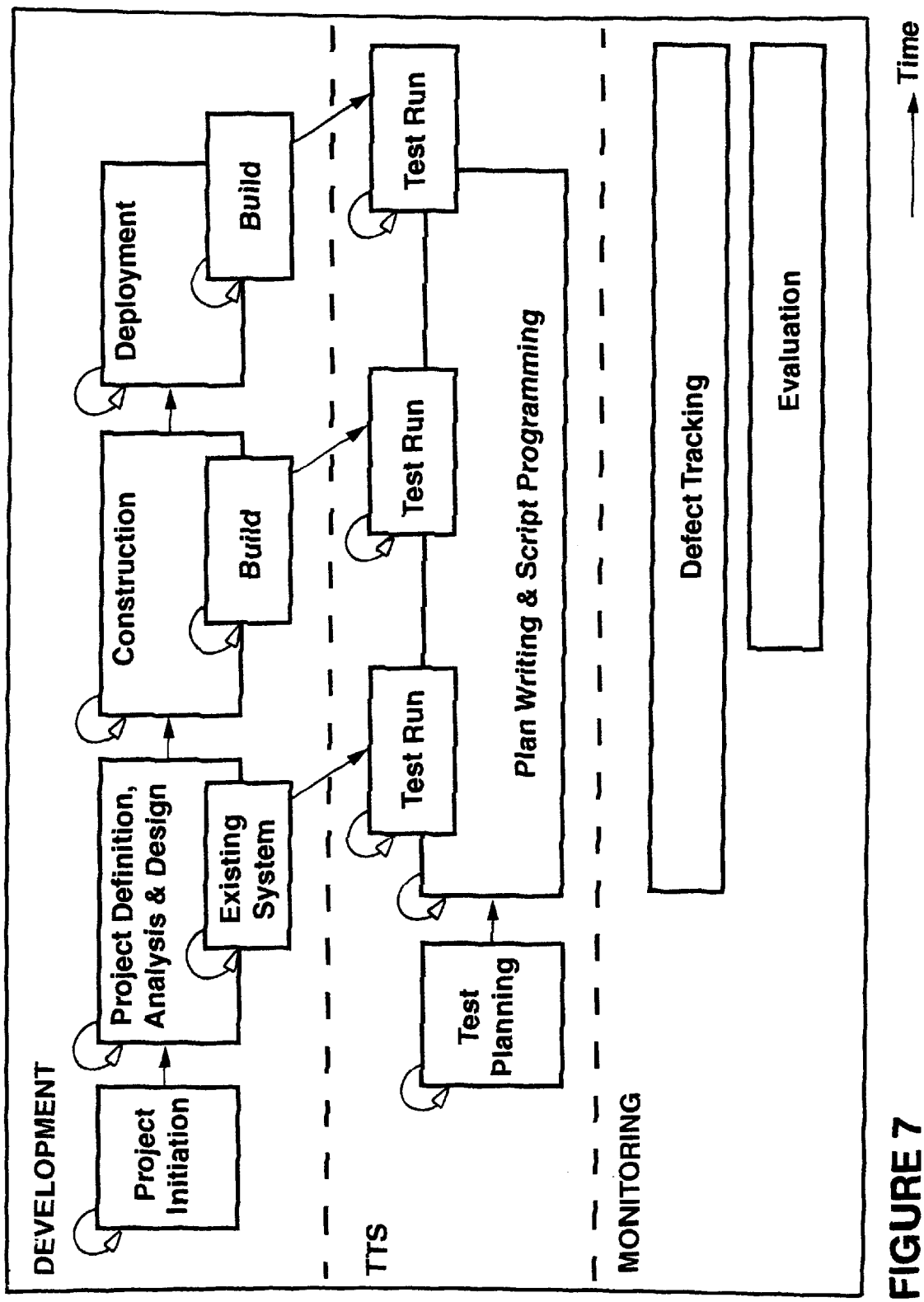
FIG. 7 is a diagram depicting the cycle of testing according to the embodiment method as an ongoing part of developing a new or modified software system.

As foreshadowed above, application of the inventive method to automated testing preferably begins at a relatively early stage of software system development. FIG. 7 shows the testing life cycle in the environment of the invention.

As the Development box (FIG. 7) shows, the process begins with Project Initiation. Project Definition, Analysis and Design stages follow, with the Functional Specification being written in the Analysis stage. Construction then begins. Finally, the system enters the Deployment sage. These stages tend to be iterative, as indicated by the loops, and reversions to earlier stages can occur.

During the Construction stage, a number of Builds are released for testing, corresponding for example to development milestones. Builds are also released for testing during the Deployment stage.

In the Testing box (FIG. 7), Test Planning is shown as beginning as soon as Project Initiation is complete, and proceeds in parallel with Project Definition.

A business decision may be made to begin writing transaction and test plans while the Functional Specification is still in a draft stage. This gives a substantial time to market benefit, which must be traded off against the possibility of rework costs if the draft undergoes major change.

During Construction each new Build undergoes preliminary testing using the test plans and test scripts written to date. In this iterative process, many defects in Builds, Test plans and test scripts are uncovered and corrected before formal testing begins. Stubs may be used.

By the time the Construction stage is complete, the test plans and test scripts required will have been developed and proven. Final overall testing can be started immediately. Of course, by this time any stubs in the system have been replaced with the required user interfaces.

Sometimes, one may need to refine (or develop) test plans and test scripts for functionality that is already present in the existing system. In that case the existing system may be used to check out the test plans and test scripts involved. This can be done at an early stage, for example while Specifications are still under development.

In this specification, at least MS-DOS, Microsoft Windows and Visual basic are trademarks of Microsoft Corporation. SQA, SQA Suite, and SQA Robot, are trademarks of SQA, Inc of Woburn, Mass. TRUST and TTS are trade marks of Bankers Trust Australia Limited.

EXAMPLE 1

To illustrate the characteristic language of the TTS Plans, a simple example will now be given. This exemplary Plan is intended to test the ability of a trust management software system, eg the applicants' TRUST system, to accept deposits to a specific unit trust, identified as the CMT unit trust. The following TTS Plan creates an investor named Jane Watson aged 55, deposits $2400 in the CMT trust for her, and verifies that the value of the investment is in fact $2400.

```
JANE,       INVADD,      JANE WATSON
SIMPLE40, AMD001,  INDV,   @JANE,   GEN_BARCODE( ),   GEN_DATE(-
55Y)
SIMPLE60, DEPNBK, @JANE,   GEN_BARCODE( ),   CMT,   GEN_DATE( ),
2400
SIMPLE80, IFNHIS,    @JANE, CMT, CMT, 2400.00, , , ?
```

This simple TTS Plan is now explained, line by line.
Basic syntax
Each line has, in order:
- A unique line identifier (eg. JANE above)
- A TTS Script name (eg. INVADD)
- Possibly one or more parameters (eg. JANE WATSON)

Line identifiers, TTS Script names and parameters are separated with commas and optionally whitespace. Line identifiers must be named in the same way as 8-character DOS filenames.

```
    INVADD

JANE,             INVADD, JANE WATSON
```

To create an investor, the TTS Script INVADD is invoked from the set of Scripts for TTS.

Some TTS Scripts return values which are available to later TTS Scripts as the TTS Plan runs. For example, INVADD returns the Client ID of the new investor.

To supply this Client ID as a parameter to another TTS Script, the line identifier of INVADD is preceded with the "@" sign as a parameter broker. In the second executable line, AMD001 needs a Client ID as its second parameter, and @JANE is used as a reference.

This aspect of the language assists in minimising hard-coding of inputs to scripts and instead optimises parameter decouplings. Both consequences are important elements in reducing the nose-to-screen and supervision times relative to known automated testing tools.

```
AMD001

SIMPLE40, AMD001,  INDV,   @JANE,   GEN_BARCODE( ),   GEN_DATE(-
55Y)
```

The TTS Script AMD001 amends investor details.

INDV, the first parameter supplied, indicates the client type (individual).

The second parameter, @JANE, is a reference to the Client ID of the investor, Jane Watson. The plan writer does not have to know, or hard code, the particular Client ID provided by the system.

The third parameter is a barcode number. The notation, GEN_BARCODE(), tells TTS to generate a unique barcode number. Generators like GEN_BARCODE are utility functions which return a unique value each time they are called. Again, generators are used to avoid hardcoding.

The last parameter is the date of birth of the investor. Another generator, GEN_DATE, has been used to automatically generate this. The argument-55Y indicates a date 55 years in the past.

```
DEPNBK

SIMPLE60, DEPNBK, @JANE,   GEN_BARCODE( ),   CMT,   GEN_DATE( ),
2400
```

The TTS Script DEPNBK makes deposits to funds in a trust.

The first parameter, @JANE, is again a reference to the Client ID.

The second parameter, GEN-BARCODE(), again generates a unique barcode number.

Next is the Trust Mnemonic, CMT, indicating the trust to receive the deposit.

GEN_DATE() is the Effective Date for the deposit. Here GEN_DATE has not argument so TTS generates the current TRUST Business Date, the default.

The last parameter is the Total Fund Amount, 2400. An amount of $2400.00 is deposited in the fund.

```
IFNHIS

SIMPLE80, IFNHIS,   @JANE, CMT, CMT, 2400.00,,,?
```

The TTS Script IFNHIS enquires on a client's fund details, comparing one or more balances to expected values.

@JANE is a reference to the Client ID.

CMT is the Trust Mnemonic.

The second CMT is the Fund Mnemonic.

The fourth parameter is the expected Investment Value. Because the Investment Value is expected to be $2400, this parameter has been set to 2400.00. When the TTS Plan is run, if TRUST reports the Investment Value to be $2400 then TTS will put a "Success" entry in the Test Log. Otherwise there will be a "Failure" entry in the Test Log. By examining such entries in the Test Log, it can be seen at a glance if the test run has been successful.

The next two parameters, which are optional, have been omitted. Each is marked by a comma. (Some parameters, for example the Client ID, are not optional.)

Parameter number seven for IFNHIS is the expected Redemption Value. A question mark has been supplied as the value of this parameter. This causes the TTS Scripts IFNHIS to write the amount of the Redemption Value (as supplied by TRUST) to the Test Log, where it can be examined after the test completes. This question mark notation may be used for any parameter that accepts an expected value.

It has been explained how a TTS Script may return a value which may later be referenced by other TTS Scripts invoked in the same TTS Plan. In the example below, @ANNE is a reference to the Client ID of Anne Taylor:

```
ANNE,    INVADD,  ANNE TAYLOR
FIRST10, AMD001,  INDV,   @ANNE,  GEN_BARCODE( ),  GEN_DATE(-
30Y)
```

When a TTS Plan terminates, it leaves a legacy in the form of an Inheritance File containing the most recent values returned by TTS Scripts invoked while the TTS Plan was running.

These values are accessible to any TTS Plan that runs at a later time, through the use of the TTS Script INHERIT.

For example, suppose the above TTS Plan is first.pln and its Inheritance File is c:/inherit/first.inh. Consider the following TTS Plan, which would be run after first.plncompletes:

```
SECOND,    INHERIT,  c:\inherit\first.inh
SECOND10,  DEPNBK,   @ANNE,  GEN_BARCODE( ),  CMT,  GEN_DATE( ),
10500
SECOND20,  IFNHIS,   @ANNE, CMT, CMT, ?,,, ?
```

After invoking the TUS Script INHERIT in the first line, the Client ID of Anne Taylor has been specified in the second and third lines using the reference @ANNE.

EXAMPLE 2

The following is a sample test plan incorporating elements similar to the simple test plan set out in Example 1. FIG. 8 shows the contents of the Plan Tables 54after this plan has been successfully parsed by SDL parser 41 and plan parser 42.

```
THETRUST,  SET,        BTA_PRM_STRING,  "SMT"
THEFUND    SET,        BTA_PRM_STRING,  "EQU"
GETDATE,   BTA_DATE
LOOP,      PERFORM,    3
CLIENT     INVADD
AMEND,     AMD001,INDV,@CLIENT,GEN_BARCODE( )GEN_DATE (-45Y-6D)
DEPOSIT,   DEPNBK,  @CLIENT,  GEN_BARCODE( ),  @THETRUST,DATE  (-10D)
           (100,200,300)
TRANID,    IFNHIS, @CLIENT,@THETRUST,@THEFUND
LOOPEND,   END_PERFORM
REVERSE,   REVERSAL,DEP,@TRANID,"Correction"
FINISH,    EXIT
```

A description of how the Interpreter 44 treats each entry in Action Table follows:

Actions 1 and 2 will not do anything; Plan Parser 42 has already loaded the constant values in Reference Table.

Action 3 will call the BTA_DATE (get the current Intact date) script which requires no parameters, hence Short-Value and LongValue are set to 0. Normally Trust commands that return a parameter string will have a corresponding entry in Reference Table to store the parameter string, but this command returns a parameter of type <systemdate>—the current Intact date —and this is stored in the special variable BTA_sCurrentIntactDate.

Action 4 signifies the start of a loop. The current nesting level is stored in ShortValue and the iteration number in LongValue (which is incremented by 1), both of which are used only in debug mode.

Action 5 will call the INVADD (add a new investor) script which also requires no parameters but does return a parameter of type <clientid>, a user-defined type defined in the SDL. Entry 3 of Reference Table will receive the resultant Client Id in its Resolution column, and all commands that make reference to this value will have a pointer to this entry in Symbol Table.

Action 6 will call the AMD001 (modify investor details) script with four parameters stored in Symbol Table entries 1 through 4. Parameter 1 is the Client Type string "INDV"; parameter 2 is a reference to the Client Id returned in Line Id "CLIENT"; parameter 3 is a generated unique Barcode number; and parameter 4 is a generated date (the investor's date of birth). The date modification string "-45Y-6D" in the Value column will be applied to the current Intact date.

Action 7 will call the DEPNBK (perform a non-banked deposit) script with five parameters stored in Symbol Table entries 5 through 9. Parameter 1 is also a reference to the Client Id returned in Line Id "CLIENT"; parameter 2 is again a generated unique Barcode Number; parameter 3 is a reference to the constant defined in Line Id "THE TRUST" which will be replaced by the string "SMT"; parameter 4 is also a generated date (the effective date); and parameter 5 is a string containing the Total Amount to be deposited into the first three Funds within this Trust.

Action 8 will call the IFNHIS (inquire on an investors deposit in a specific Trust and Fund) script with three parameters stored in Symbol Table entries 10 through 12. Parameter 1 again refers to the Client Id returned in Line Id "CLIENT", parameter 2 is another reference to the constant defined in Line Id "THE TRUST"; and parameter 3 is a reference to the constant defined in Line Id "THE FUND".

Action 9 marks the end of a loop. CmdPtr contains the original repeat count, ShortValue contains the pointer to the start of the loop and LongValue contains the number of outstanding repetitions. While LongValue exceeds 0 it is decremented by 1 and the next action to be performed will be Action 4, as specified by Short-Value; when LongValue reaches 0, indicating that the required number of iterations have been performed, two things are done in case this loop is nested and will be re-processed; firstly, the current repeat count is reset to the original repeat count (ie LongValue is set to CmdPtr) and, secondly, the iteration number of Action 4 is initialised to 0.

Action 10 will call the REVERSAL (reverse a previous deposit, redemption or switch transaction) script with three parameters stored in Symbol Table entries 13 through 15. Parameter 1 is the literal "DEP"; parameter 2 is a reference to the Transaction Id returned in Line Id "TRANID"; and parameter 3 is the string "Correction".

Action 11 indicates that there are no more actions to be performed. This command is not strictly required if it is in the last line of the plan.

I claim:

1. A method of determining the functionality of a software system, including:

inputting a test plan to the software system via a software testing interface program and writing the test plan; and logging an indication of one or more resulting outputs of the software system compared to expected output(s);

wherein said test plan invokes a sequence of test scripts and includes associated parameter inputs for the test scripts, and an expected output of a function or transaction of each test script, which test scripts are selected from a set of test scripts each able, when input to the software system via the software testing interface program, to prompt performance of a transaction or function for which the software system is designed; and wherein said inputting of the test plan to the software system utilises user interface software which communicates with the software testing interface program as if it were a recording made earlier by the software testing interface program.

2. A method according to claim 1 further including preparing said test plan.

3. A method according to claim 2 further including preparing said set of test scripts.

4. A method according to claim 1 wherein the user interface software invokes each test script of said sequence of test scripts in the test plan and presents each script to the software testing interface program so that the latter also reads the script as a recording made earlier by the software testing interface program.

5. A method according to claim 1 wherein the user interface software includes at least a graphical user interface, a test script definition language parser, a test plan parser which generates a set of action codes for each test plan, and an interpreter which responds to the action codes and interacts with the software system under test.

6. A method according to claim 1 wherein the user interface software checks the test plans for syntax errors prior to running.

7. A method according to claim 1 wherein the parameter inputs for test scripts after the first include parameter inputs derived from recorded outputs of earlier test scripts.

8. A method according to claim 1 wherein running of each of the test plans includes recordal of an inheritance file containing the values returned by test scripts while the test plan was running.

9. A method according to claim 1 wherein said test scripts are written in a simple programming language, and include a mix of general routines selected from the language, and routines specific to said software system.

10. A method according to claim 1 wherein the inputting and logging steps are carried out in computer apparatus in which the software testing interface program is installed and which includes memory means in which the test scripts and test plans are stored.

11. A method according to claim 1 further including generating a response indicative of functionality of the software system.

12. A method of determining the functionality of a software system, including:

inputting a test plan to the software system via a software testing interface program and writing the test plan; and logging an indication of one or more resulting outputs of the software system compared to expected output(s);

wherein said test plan invokes a sequence of test scripts and includes associated parameter inputs for the test scripts, and an expected output of a function or transaction of each test script, which test scripts are selected from a set of test scripts each able, when input to the software system via the software testing interface program, to prompt performance of a transaction or function for which the software system is designed; and wherein the test plan is written in a characteristic language utilizing names for the respective test scripts, an established sequence for parameter inputs, identifiers for the respective parameters, parameter generator notation, and parameter broker notation instructing derivation of parameter inputs from recorded outputs of other test scripts.

13. A method according to claim 12 wherein the parameter inputs for test scripts after the first include parameter inputs derived from recorded outputs of earlier test scripts.

14. A method according to claim 12 wherein running of each of the test plans includes recordal of an inheritance file containing the values returning by test scripts while the test plan was running.

15. A method according to claim 12 wherein said test scripts are written in a simple programming language, such as visual basic, and include a mix of general routines selected from the language, and routines specific to said software system.

16. A method according to claim 12 further including preparing said test plan.

17. A method according to claim 16 further including preparing said set of test scripts.

18. A method according to claim 12 wherein the inputting and logging steps are carried out in computer apparatus in which the software testing interface program is installed and which includes memory means in which the test scripts and test plans are stored.

19. A method according to claim 12 further including generating a response indicative of functionality of the software system.

20. A method of determining the functionality of a software system, including:

inputting a test plan to the software system via a software testing interface program and writing the test plan; and logging an indication of one or more resulting outputs of the software system compared to expected output(s);

wherein said test plan invokes a sequence of test scripts and includes associated parameter inputs for the test scripts, and an expected output of a function or transaction of each test script, which test scripts are selected from a set of test scripts each able, when input to the software system via the software testing interface program, to prompt performance of a transaction or function for which the software system is designed; and wherein the test scripts are characterised if their operation for a first user affects other users of said software system.

21. A method according to claim 20 further including preparing said test plan.

22. A method according to claim 21 further including preparing said set of test scripts.

23. A method according to claim 20 wherein the parameter inputs for test scripts after the first include parameter inputs derived from recorded outputs of earlier test scripts.

24. A method according to claim 20 wherein running of each of the test plans includes recordal of an inheritance file containing the values returned by test scripts while the test plan was running.

25. A method according to claim 20 wherein said test scripts are written in a simple programming language, such as visual basic, and include a mix of general routines selected from the language, and routines specific to said software system.

26. A method according to claim 20 wherein the inputting and logging steps are carried out in computer apparatus in which the software testing interface program is installed and which includes memory means in which the test scripts and test plans are stored.

27. A method according to claim 20 further including generating a response indicative of functionality of the software system.

28. Computer apparatus for determining the functionality of a software system, including:

first memory means to store a set of test scripts each able, when input to the software system via a software testing interface program, to prompt performance of a transaction or function for which the software system is designed;

second memory means to store one or more test plans each invoking a sequence of said test scripts and including associated parameter inputs for the test scripts and an expected output of the transaction or function of each test script;

computing means, including installed user interface software and an installed software testing interface program, and operatively connectable to said first and second memory means, for selectively inputting and running the test plan(s) to the software system via the software testing interface program, said user interface software communicating with the software testing interface program as if it were a recording made earlier by the software testing interface program; and logging means for logging an indication of one or more resulting outputs of the software system compared to expected output(s).

29. Apparatus according to claim 28 wherein, in use of the apparatus, the user interface software invokes the test script identified in the test plan and presents each script to the software testing interface program so that the latter also reads the script as a recording made earlier by the software testing interface program.

30. Apparatus according to claim 28 wherein the parameter inputs for test scripts after the first include parameter inputs derived from recorded outputs of earlier test scripts.

31. Apparatus according to claim 28 wherein the test plans include generator utility functions to uniquely generate and/or identify parameter values.

32. Apparatus according to claim 28 wherein the test plan(s) are written in a characteristic language utilising names for the respective test scripts, an established sequence for parameter inputs, identifiers for the respective parameters, parameter generator notation, and parameter broker notation instructing derivation of parameter inputs from recorded outputs of other test scripts.

33. Apparatus according to claim 28, further including third memory means to store an inheritance file containing the values returned by test scripts while the test plan was running.

34. Apparatus according to claim 28 wherein the user interface software includes at least a graphical user interface, a test script definition language parser, a test plan parser which generates a set of action codes for each test plan, and an interpreter which responds to the action codes and interacts with the software system.

35. Apparatus according to claim 28 wherein the test scripts are characterised if their operation for a first user affects other users of said software system.

36. Apparatus according to claim 28 wherein the user interface software includes provision to check the test plan (s) for syntax errors prior to running.

37. A method of determining the functionality of a software system, including:

inputting a test plan to the software system via a software testing interface program; and logging an indication of one or more resulting outputs of the software system compared to expected output(s);

wherein said test plan invokes a sequence of test scripts selected from a set of test scripts each able, when input to the software system via a software testing interface program, to prompt performance of a transaction or function for which the software system is designed; and wherein said inputting of the test plan to the software system utilises user interface software which presents each test script to the software testing interface program so that the latter reads the script as if it were a recording made earlier by the software testing interface program.

38. A method according to claim 37 wherein the parameter inputs for test scripts after the first include parameter inputs derived from recorded outputs of earlier test scripts.

39. A method according to claim 37 wherein generator utility functions are employed in test plans to uniquely generate and/or identify parameter values.

40. A method according to claim 37 wherein the test plans are written in a characteristic language utilising names for the respective test scripts, an established sequence for parameter inputs, identifiers for the respective parameters, parameter generator notation, and parameter broker notation instructing derivation of parameter inputs from recorded outputs of other test scripts.

41. A method according to claim 37 wherein running of each of the test plans includes recordal of an inheritance file containing the values returned by test scripts while the test plan was running.

42. A method according to claim 37 wherein said test scripts are written in the language of the software system under test, and include a mix of general routines selected from the language, and routines specific to said software system.

43. A method according to claim 37 wherein the user interface software includes at least a graphical user interface, a test script definition language parser, a test plan parser which generates a set of action codes for each test plan, and an interpreter which responds to the action codes and interacts with said software system.

44. A method according to claim 37 wherein the test scripts are characterised if their operation for a first user affects other users of said software system.

45. A method according to claim 37 wherein the user interface software checks the test plans for syntax errors prior to running.

46. A method according to claim 37 wherein the inputting and logging steps are carried out in computer apparatus in which the test scripts and test plans are stored in memory means and in which the software testing program is installed and logging steps are carried out in computer apparatus in which the software testing interface program is installed and which includes memory means in which the test scripts and test plans are stored.

47. A method according to claim 37 further including generating a response indicative of functionality of the software system.

48. Computer apparatus for determining the functionality of a software system, including:
  first memory means to store a set of test scripts each able, when input to the software system via a software testing interface program, to prompt performance of a transaction or function for which the software system is designed;
  second memory means to store one or more test plans each invoking a sequence of said test scripts;
  computing means, including installed user interface software and an installed software testing interface program, and operatively connectable to said first and second memory means, for selectively inputting the test plan(s) to the software system via the software testing interface program and running the test plan; and
  logging means for logging an indication of one or more resulting outputs of the software system compared to expected output(s);
  wherein the user interface software is arranged for presenting each test script to the software testing interface program so that the latter if it were a recording made earlier by the software testing interface program.

49. Apparatus according to claim 48 wherein the parameter inputs for test scripts after the first include parameter inputs derived from recorded outputs of earlier test scripts.

50. Apparatus according to claim 48 wherein the test plans include generator utility functions to uniquely generate and/or identify parameter values.

51. Apparatus according to claim 48 wherein the test plan(s) are written in a characteristic language utilising names for the respective test scripts, an established sequence for parameter inputs, identifiers for the respective parameters, parameter generator notation, and parameter broker notation instructing derivation of parameter inputs from recorded outputs of other test scripts.

52. Apparatus according to claim 48, further including third memory means to store an inheritance file containing the values returned by test scripts while the test plan was running.

53. Apparatus according to claim 48 wherein the user interface software includes at least a graphical user interface, a test script definition language parser, a test plan parser which generates a set of action codes for each test plan, and an interpreter which responds to the action codes and interacts with said software system.

54. Apparatus according to claim 48 wherein the test scripts are characterised if their operation for a first user affects other users of said software system.

55. Apparatus according to claim 48 wherein the user interface software includes provision to check the test plan (s) for syntax errors prior to running.

56. Computer apparatus for determining the functionality of a software system, including;
  first memory means to store a set of test scripts each able, when input to the software system via a software testing interface program, to prompt performance of a transaction or function for which the software system is designed;
  second memory means to store one or more test plans each invoking a sequence of said test scripts and including associated parameter inputs for the test scripts and an expected output of the transaction or function of each test script, wherein the test plan(s) are written in a characteristic language utilizing names for the respective test scripts, an established sequence for parameter inputs, identifiers for the respective parameters, parameter generator notation, and parameter broker notation instructing derivation of parameter inputs from recorded outputs of other test scripts;
  computing means, including installed user interface software and an installed software testing interface program, and operatively connectable to said first and second memory means, for selectively inputting and running the test plan(s) to the software system via the software testing interface program; and
  logging means for logging an indication of one or more resulting outputs of the software system compared to expected output(s).

57. Computer apparatus for determining the functionality of a software system, including:
  first memory means to store a set of test scripts each able, when input to the software system via a software testing interface program, to prompt performance of a transaction or function for which the software system is designed;
  second memory means to store one or more test plans each invoking a sequence of said test scripts and including associated parameter inputs for the test scripts and an expected output of the transaction or function of each test script;
  computing means, including installed user interface software and an installed software testing interface program, and operatively connectable to said first and second memory means, for selectively inputting and running the test plan(s) to the software system via the software testing interface program; and
  logging means for logging an indication of one or more resulting outputs of the software system compared to expected output(s);
  wherein the user interface software includes at least a graphical user interface, a test script definition language parser, a test plan parser which generates a set of action codes for each test plan, and an interpreter which responds to the action codes and interacts with said software system.

58. Computer apparatus for determining the functionality of a software system, including;

first memory means to store a set of test scripts each able, when input to the software system via a software testing interface program, to prompt performance of a transaction or function for which the software system is designed, which test scripts are characterised if their operation for a first user affects other users of said software system;

second memory means to store one or more test plans each invoking a sequence of said test scripts and including associated parameter inputs for the test scripts and an expected output of the transaction or function of each test script;

computing means, including installed user interface software and an installed software testing interface program, and operatively connectable to said first and second memory means, for selectively inputting and running the test plan(s) to the software system via the software testing interface program; and logging means for logging an indication of one or more resulting outputs of the software system compared to expected output(s).

\* \* \* \* \*